United States Patent
Rode et al.

(10) Patent No.: US 7,477,573 B2
(45) Date of Patent: Jan. 13, 2009

(54) OSCILLATION GENERATOR FOR SEISMIC APPLICATIONS

(75) Inventors: Walter Rode, Landesbergen (DE); Stefan Cramm, Langlingen (DE)

(73) Assignee: Institut Fuer Geowissenschaftliche Gemeinschaftsaufgaben, Hannover (DE)

(*) Notice: Subject to any disclaimer, the term of this patent is extended or adjusted under 35 U.S.C. 154(b) by 0 days.

(21) Appl. No.: 11/894,922

(22) Filed: Aug. 22, 2007

(65) Prior Publication Data

US 2008/0123471 A1    May 29, 2008

(30) Foreign Application Priority Data

Nov. 24, 2006   (DE) .................. 10 2006 055 457

(51) Int. Cl.
*G01V 1/155* (2006.01)

(52) U.S. Cl. .................................... 367/189

(58) Field of Classification Search ............ 367/189, 367/182; 181/113
See application file for complete search history.

(56) References Cited

U.S. PATENT DOCUMENTS

| | | | | |
|---|---|---|---|---|
| 2,776,560 A | * | 1/1957 | Erath et al. ........... | 367/182 |
| 4,159,464 A | * | 6/1979 | Hall, Jr. .............. | 367/182 |
| 5,172,345 A | * | 12/1992 | van der Poel ......... | 367/182 |
| 7,136,325 B2 | | 11/2006 | Polom | |
| 2008/0123471 A1 | * | 5/2008 | Rode et al. ........... | 367/189 |

FOREIGN PATENT DOCUMENTS

DE    102 35 126    11/2003

* cited by examiner

*Primary Examiner*—Dan Pihulic
(74) *Attorney, Agent, or Firm*—Jordan and Hamburg LLP

(57) ABSTRACT

An oscillation generator for seismic applications includes a housing in which two coils are housed, both coils being acted upon with alternating current or electrical impulse and permanent magnets, and which is coupled via a coupling element to the object to be examined. The coils of the oscillation generator are each borne on a center leg of a packet of sheets cut in an E-shape, the free legs of the sheets associated with respective ones of the coils pointing away from one another. The coils are coupled to a block that can be linearly displaced in the housing. Securely attached to the side walls of the housing on a non-magnetic plate are permanent magnets that are disposed in the extension of the free end of the legs of the sheets, and the polarity of the exterior permanent magnets is reversed relative to the center permanent magnet.

10 Claims, 1 Drawing Sheet

OSCILLATION GENERATOR FOR SEISMIC APPLICATIONS

BACKGROUND OF THE INVENTION

The invention relates to an oscillation generator for seismic applications, comprising a housing in which two coils are housed, both coils being acted upon with alternating current or electrical impulse and permanent magnets, and which is coupled via a coupling element to the object to be examined.

Such oscillation generators are known, for example, from DE 102 35 126. Seismic measurements are frequently, if not usually, performed in the open, far from any publicly accessible source of current. Often, batteries and emergency power generators used with the oscillation generators cannot cover the demand for current, they are quite heavy, and they necessitate considerable complexity in terms of transport and personnel. Therefore, for seismic measurements, it is very important to possess energy-saving measuring equipment that does not weigh too much.

SUMMARY OF THE INVENTION

The invention avoids the disadvantages of the current prior art. It is the object of the invention to create an energy-efficient oscillation generator, the weight of which is low relative to its output.

The oscillation generator according to the invention is distinguished in that the coils are each borne on the center leg of a packet of sheets cut in an E-shape, in that the coils are coupled to a block that can be linearly displaced in the housing, in that the free legs of the sheets cut in an E-shape point away from one another, in that securely attached to the side walls of the housing on a non-magnetic plate are permanent magnets that are disposed in the extension of the free end of the legs of the sheets cut in an E-shape, and in that the polarity of the exterior permanent magnets is reversed relative to the center permanent magnet.

This oscillation generator is a shear wave source for the frequency range from 20 to 500 Hz. It works very effectively due to the cooperation of electromagnets and permanent magnets. Relative to its mechanical output, it is lightweight, small in terms of volume, and sparing in terms of its consumption of electrical energy. It is thus particularly suited for use in the open.

This oscillation generator can be easily constructed mechanically in that arranged in the housing are two rails, axes or similar bases on which the block formed by the two coils can be linearly displaced using linear ball bearings.

The effectiveness of this oscillation generator can be increased in that the sheets bearing the coils are grain-oriented transformer sheets. Because of this, in particular, heat generation is reduced and the output lost is correspondingly lower.

Likewise, the effectiveness of this oscillation generator can be further increased in that neo delta magnets are used for the permanent magnets.

Usefully, two elbows, each bearing a permanent magnet, are mounted on the base plate of the housing, and between them is an arm that also carries a permanent magnet and that is mounted on the displaceable block. This part of the oscillation generator works like a compression spring system which holds the displaceable block with the two coils in center position.

The two coils are switched inverted. When the current amplitude is positive, the magnetic field on the legs of the sheets bearing the coils on the one side repels the permanent magnetic field of the laterally installed strong permanent magnets, attracting on the other side. This leads to a doubling of the magnetically generated mechanical forces. When the current amplitude is negative, the magnetic forces act in the reverse manner. The mass is moved back and forth due to the magnetic field that alternates because of the use of alternating current. At the same time, the permanent magnets reduce the consumption of electrical energy.

The essence of the invention is explained in greater detail in the following using a schematic exemplary embodiment depicted in the drawing.

DETAILED DESCRIPTION OF THE INVENTION

Figure 1:
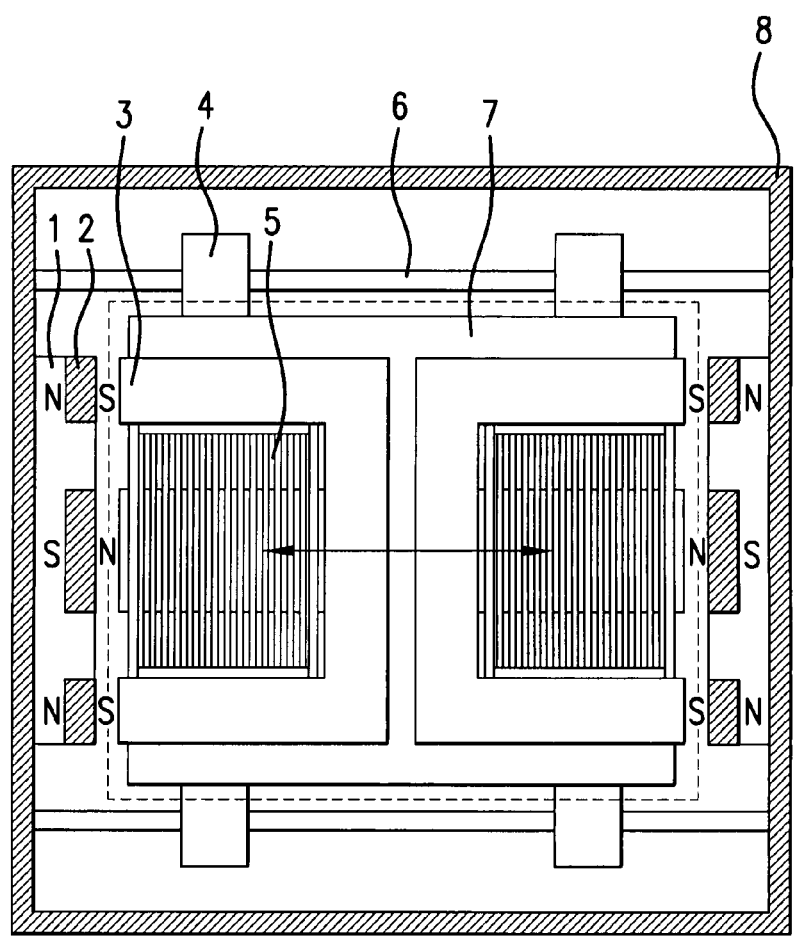
FIG. 1 is a plan view of the oscillation generator from above.
Figure 2:
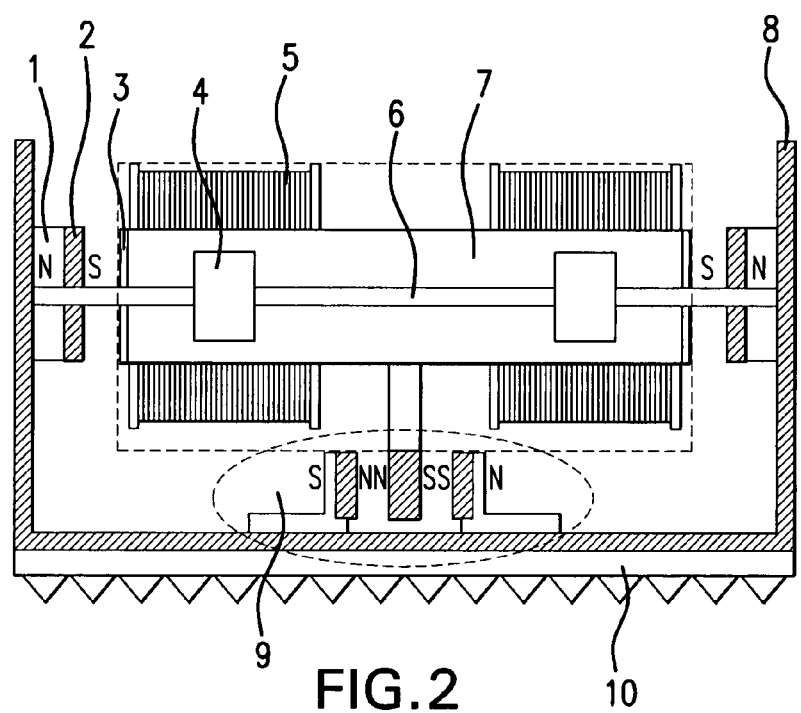
FIG. 2 is a side view of the oscillation generator.

Referring to FIGS. 1 and 2, a housing comprises a base 10 and two walls 8 produced from a non-magnetic material such as, for example, aluminum. Magnet holders 1 for strong permanent magnets 2 are rigidly attached to walls 8. Two bars 6 are arranged parallel to the base 10 between the walls 8. A block 7 comprises two coils 5 that are acted upon inversely with electrical energy, are borne by a core from a packet made of sheets 3 stamped in an E-shape. Block 7 is displaceably mounted on bars 6 via roller bearings 4. The permanent magnets 2 are arranged opposing each of the free ends of the legs of the E-shaped sheets 3. A centering unit 9, comprising two elbows, each carrying one magnet, is mounted on the base 10 of the housing. Engaging between the two elbows that are mounted on the housing base 10 and that each carry a magnet is an arm that is on the block 7 and that is also fitted with a magnet. The magnets of the arm have the same polarity as the magnets opposing them on the elbows so that the magnets are mutually repellant and center the arm in the middle. A relief for mechanically coupling the housing to the ground is disposed under the base 10.

LEGEND

1. Magnet holder
2. Permanent magnet
3. Sheet packet
4. Roller bearing
5. Coil
6. Bar
7. Block with two coils
8. Housing side wall
9. Centering unit
10. Base plate with relief

The invention claimed is:

1. An oscillation generator for seismic applications, comprising:

a housing;

permanent magnets securely attached to the side walls of said housing on a non-magnetic plate, said permanent magnets including a center permanent magnet which is disposed between two exterior permanent magnets, a polarity of said exterior permanent magnets being reversed relative to said center permanent magnet;

a pair of coils housed in said housing being acted upon with alternating current or electrical impulse and the permanent magnets, said coils each being borne on a center leg of a packet of sheets cut in an E-shape, legs of a respective one of said packet of sheets which is associated with one of the pair of coils being oriented to point away from the legs of another respective one of said packet of sheets which is associated with a remaining one of the pair of coils, an extension of the free ends of the legs of said sheets cut in an E-shape positionally corresponding to said permanent magnets; and a block to which said coils are coupled, said block being linearly displaceable in said housing.

2. An oscillation generator according to claim 1, wherein said housing is coupled via a coupling element to an object to be examined.

3. An oscillation generator according to claim 1, further comprising two bars arranged in said housing on which said block including said two coils is linearly displaceable.

4. An oscillation generator according to claim 3, further comprising roller bearings via which said block is displaceably mounted on said bars.

5. An oscillation generator according to claim 1, wherein said sheets bearing said coils are grain-oriented transformer sheets.

6. An oscillation generator according to claim 1, wherein said permanent magnets are neo delta magnets.

7. An oscillation generator according to claim 1, further comprising:
two elbows each bearing a centering permanent magnet, said two elbows being mounted on a base plate of said housing; and
an arm located between said two elbows that carries another centering permanent magnet, said arm being mounted on said block.

8. An oscillation generator according to claim 7, wherein each said centering permanent magnet is oriented with a pole thereof facing a like pole of said other centering magnet carried on said arm.

9. An oscillation generator according to claim 1, wherein said coils are switched inverted.

10. An oscillation generator according to claim 1, wherein the oscillation generator is a shear wave source for a frequency range from 20 to 500 Hz.

* * * * *